(12) United States Patent
Wilkins (10) Patent No.: US 8,479,220 B2
(45) Date of Patent: Jul. 2, 2013

(54) AUTOMATICALLY CORRELATING TRANSACTION EVENTS

(75) Inventor: Andrew Wilkins, Marangaroo (AU)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 12/478,048

(22) Filed: Jun. 4, 2009

(65) Prior Publication Data

US 2010/0313202 A1 Dec. 9, 2010

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/318

(58) Field of Classification Search
None
See application file for complete search history.

(56) References Cited

U.S. PATENT DOCUMENTS

| 7,568,023 | B2 * | 7/2009 | Green et al. ................... 709/224 |
| 2004/0103193 | A1 * | 5/2004 | Pandya et al. ................. 709/224 |
| 2004/0123293 | A1 | 6/2004 | Johnson |
| 2005/0039186 | A1 * | 2/2005 | Borkan ......................... 719/310 |
| 2005/0138111 | A1 * | 6/2005 | Aton et al. .................... 709/201 |
| 2007/0027742 | A1 | 2/2007 | Emuchay et al. |
| 2007/0282922 | A1 | 12/2007 | Bohannon et al. |

\* cited by examiner

*Primary Examiner* — Emerson Puente
*Assistant Examiner* — Kimbleann Verdi
(74) *Attorney, Agent, or Firm* — Yee & Associates, P.C.; Jeffrey S. LaBaw (57) ABSTRACT

An API can be extended to automatically correlate events based on context. Started events for each context (e.g. threads of execution) are maintained on independent stacks. When an instrumented application starts a new transaction, the API generates a started event. A transaction correlation unit within the API can determine if the new transaction started during a previous transaction. If there is a previous started event on the stack, the new transaction started during the previous transaction. The transaction correlation unit can insert an outbound indicator into the new started event to associate the new transaction and the previous transaction. Then, the new started event can be pushed on the stack.

20 Claims, 5 Drawing Sheets

AUTOMATICALLY CORRELATING TRANSACTION EVENTS

BACKGROUND

Embodiments of the inventive subject matter generally relate to the field of transaction tracking, and, more particularly, to automatically correlating transaction events.

Correlating events produced from transactions and their sub-transactions is a common issue in transaction tracking. Transaction tracking systems typically rely on explicitly providing common data in transaction events (e.g., correlator tokens in Application Response Measurement (ARM)). Correlating transaction events based on common data introduces a chance for error if one application fails to provide correct information.

SUMMARY

Embodiments include a method that detects that a first transaction has started. A first started event is generated for the first transaction. It is determined if the first transaction started during a second transaction. An outbound indicator identifying the second transaction is inserted into the first started event to indicate that the first transaction is a sub-transaction of the second transaction, if it is determined that the first transaction started during the second transaction. The first started event is stored in a data structure.

Embodiments also include a computer program product for automatically correlating transaction events. The computer program product comprises a computer usable medium having computer usable program code embodied therewith. The computer usable program code comprises computer usable program configured to detect that a first transaction has started, and to generate a first started event for the first transaction. The computer usable program code is also configured to determine if the first transaction started during a second transaction. If the first transaction started during the second transaction, then the computer usable program code is configured to insert an outbound indicator identifying the second transaction into the first started event to indicate that the first transaction is a sub-transaction of the second transaction. The computer usable program code is configured to store the first started event in a data structure of started events.

Embodiments also include a computer program product for automatically correlating transaction events. The computer program product comprises a computer usable medium having computer usable program code embodied therewith. The computer usable program code comprises computer usable program code configured to detect that a first transaction is ending, and to generate a finished event for the first transaction. The computer usable program code is configured to determine if the first transaction started during a second transaction. If the first transaction started during the second transaction, then the computer usable program code is configured to insert an outbound indicator identifying the second transaction into the finished event to indicate that the first transaction is a sub-transaction of the second transaction. The computer usable program code is configured to remove the started event from a data structure of started events.

Embodiments also include an apparatus that comprises a processing unit, a network interface, and a transaction correlation unit. The transaction correlation unit is operable to detect that a first transaction has started, to generate a first started event for the first transaction, and to determine if the first transaction started during a second transaction. If the first transaction started during the second transaction, then the transaction correlation unit is operable to insert an outbound indicator identifying the second transaction into the first started event to indicate that the first transaction is a sub-transaction of the second transaction. The transaction correlation unit is operable to store the first started event in a data structure.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to Application Response Measurement (ARM), embodiments may be implemented with other application programming interfaces (APIs), such as Oracle® Trace. In other instances, well-known instruction instances, protocols, structures, and techniques have not been shown in detail in order not to obfuscate the description.

Instrumented applications utilize APIs to send events marking the beginning and end of transactions to a transaction tracking system. The transaction tracking system correlates the events based on common data in the events, such as a process identifier and a thread identifier. However, the process and thread identifiers may be reused in a short period of time causing the transaction tracking system to erroneously associate events from two distinct transactions. An API can be extended to automatically correlate events based on context. Started events for each context (e.g. threads of execution) are maintained on independent stacks. When an instrumented application starts a new transaction, the API generates a started event. A transaction correlation unit within the API can determine if the new transaction started during a previous transaction. If there is a previous started event on the stack, the new transaction started during the previous transaction. The transaction correlation unit can insert an outbound indicator into the new started event to associate the new transaction and the previous transaction. Then, the new started event can be pushed on the stack.

Figure 1:
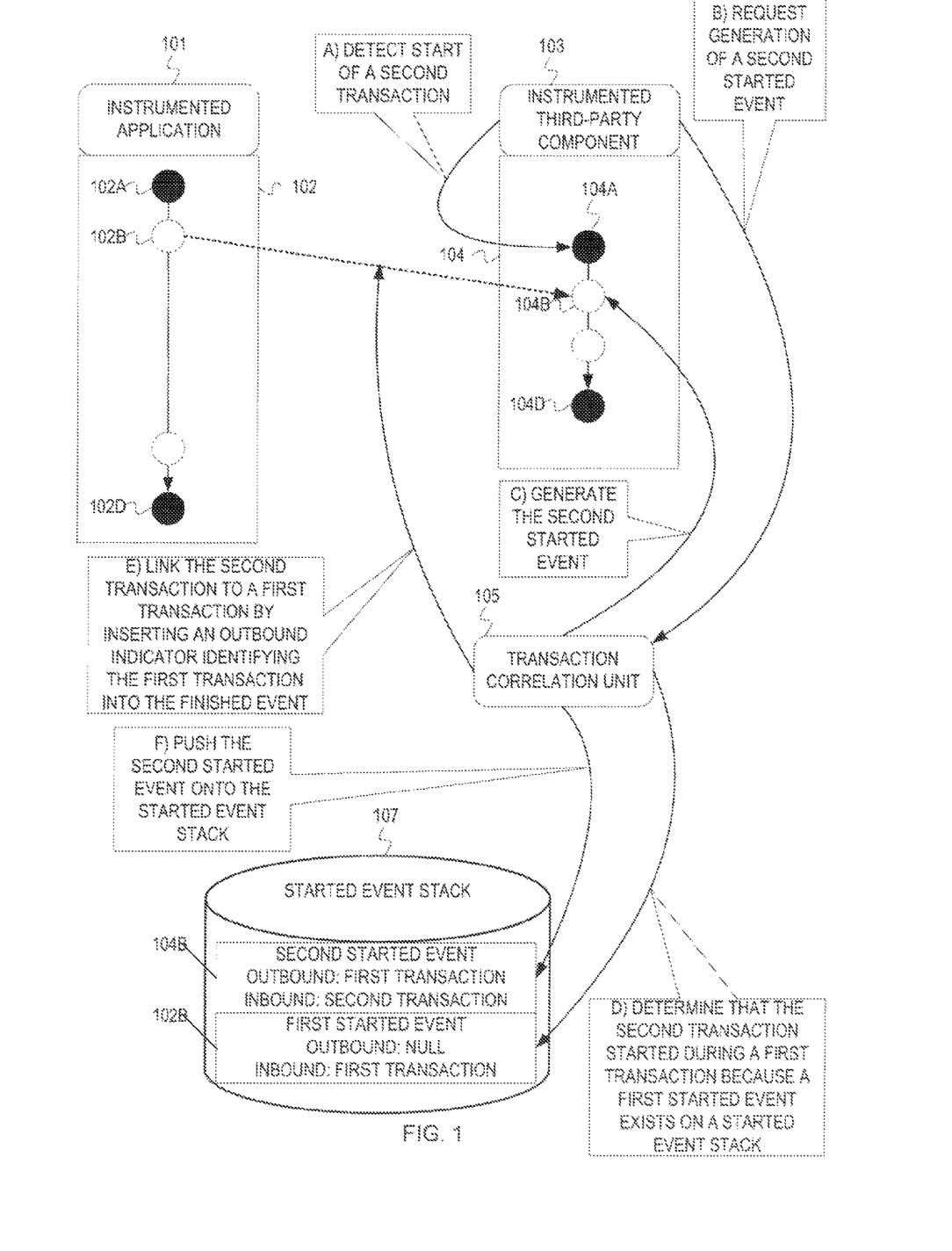
FIG. 1 depicts an example conceptual diagram of automatically correlating transaction started events.

FIG. 1 depicts an example conceptual diagram of automatically correlating transaction started events. A first transaction 102 (e.g., a point of sale (POS) system) and a second transaction 104 (e.g., a credit card processing system) exist in the same context. Examples of contexts include processes, threads, groups of threads, etc. The first transaction 102 is handled by an instrumented application 101 and the second transaction 104 is handled by in instrumented third-party component 103. A circle 102A represents the beginning of the first transaction 102, and a circle 102D represents the end of the first transaction 102. A circle 104A represents the beginning of the second transaction 104, and a circle 104D represents the end of the second transaction 104. The first transaction 102 can represent a sales transaction. The first transaction 102 initiates the second transaction 104 on the instrumented third-party component 103 to process a credit card payment. Because the first transaction 102 initiated the second transaction 104, the second transaction 104 is a sub-transaction of the first transaction 102.

At stage A, the instrumented third-party component 103 detects the start of a second transaction 104A. For example, the instrumented third-party component 103 detects a function call to the instrumented third-party component's module(s).

At stage B, the instrumented third-party component 103 requests generation of a second started event 104B. For example, the instrumented third-party component 103 requests generation of the second started event 104B through an ARM API function call.

At stage C, a transaction correlation unit 105 instantiated in accordance with an API of the instrumented third-party component 103 generates the second started event 104B.

At stage D, the transaction correlation unit 105 determines that the second transaction 104 started during a first transaction because a first started event 102B exists on a started event stack 107.

At stage E, the transaction correlation unit 105 inserts an outbound indicator that identifies the first transaction 102 into the second started event 104B to indicate that the second transaction 104 is a sub-transaction of the first transaction 102. For example, the first transaction 102 may be identified by a unique number generated by the instrumented application 101. The transaction correlation unit 105 may determine the first transaction's identifier based on the first started event 102B on the started event stack 107, a parameter passed in an API function call, etc. In addition, the transaction correlation unit 105 can insert an inbound indicator that identifies the second transaction 104 into the second started event 104B.

At stage F, the transaction correlation unit 105 pushes the second started event 104B onto the started event stack.

Figure 2:
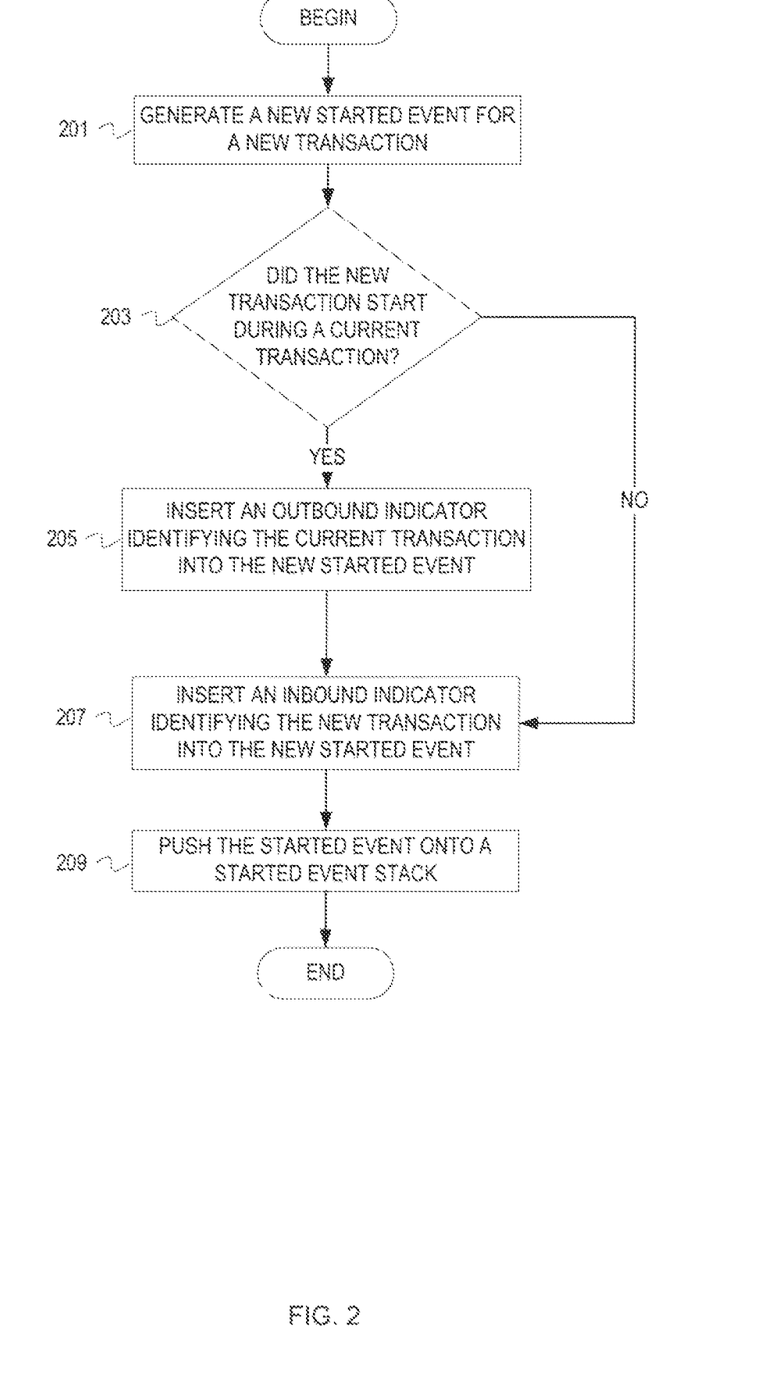
FIG. 2 depicts a flowchart of example operations for automatically correlating transaction started events.

FIG. 2 depicts a flowchart of example operations for automatically correlating transaction started events. Flow begins at block 201, where a started event for a new transaction is generated. Events comprise objects or data structures that indicate information related to transactions. The event objects or data structures comprise a set of data members (e.g., variables, fields, etc.) that represent the information. Example information includes event types (e.g., started, finished, etc.), transaction types (e.g., sales, payments, data transfers, etc.), time stamps, transaction identifiers, etc. For example, the started event is generated in response to an ARM API function call. Flow continues at block 203.

At block 203, it is determined if the new transaction started during a current transaction. Determining that the new transaction started during a current transaction comprises determining if a current started event exists on a started event stack. If a current started event exists on the started event stack, the new transaction has started during a current transaction, and the new transaction is a sub-transaction of the current transaction. If the new transaction started during a current transaction, flow continues at block 205. If the new transaction did not start during a current transaction, flow continues at block 207.

At block 205, the new transaction started during a current transaction, so an outbound indicator identifying the current transaction is inserted into the new started event. Inserting an outbound indicator comprises determining an identifier of the current transaction, and storing the identifier in a data member of the started event. For example, the current transaction's identifier can be determined based on examining a current inbound indicator of the current event on the stack. Flow continues at block 207.

At block 207, an inbound indicator identifying the new transaction is inserted into the new started event. Inserting the inbound indicator comprises determining an identifier of the new transaction, and storing the identifier in a data member of the started event. For example, the new transaction's identifier may be determined based on a parameter passed in an ARM API function call. Flow continues at block 209.

At block 209, the new started event is pushed onto the started event stack and flow ends.

Figure 3:
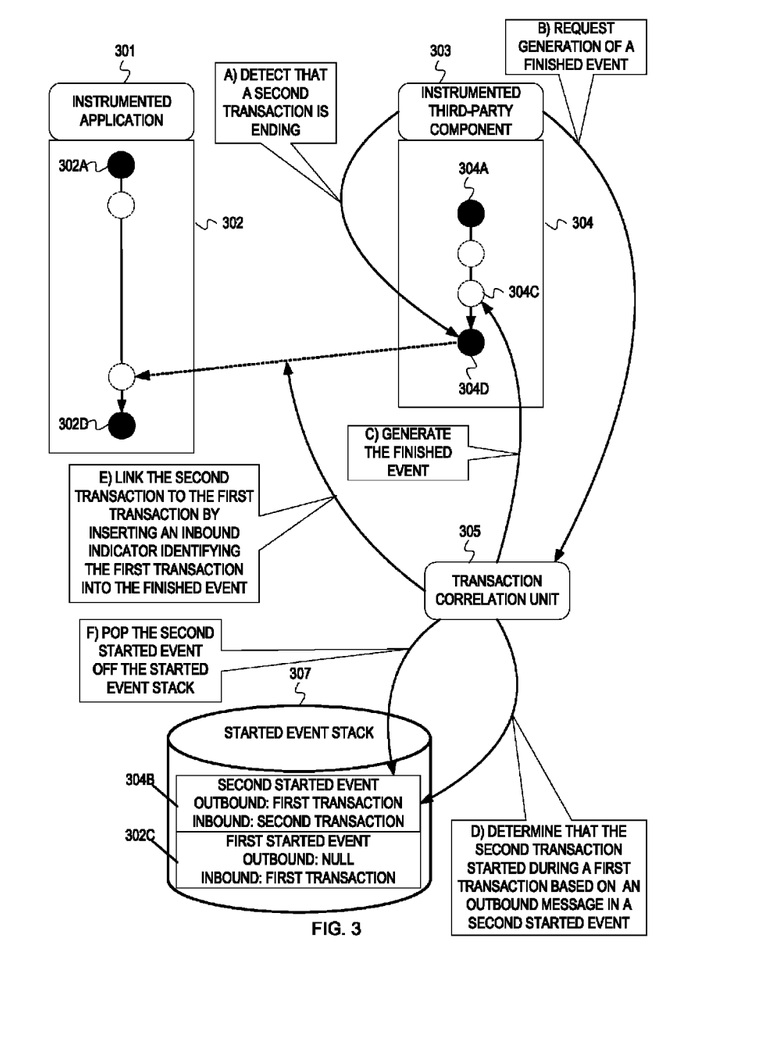
FIG. 3 is an example conceptual diagram of automatically correlating transaction finished events.

In addition, to generating started events when a transaction starts, finished events are generated when a transaction ends. FIG. 3 is an example conceptual diagram of automatically correlating transaction finished events. A first transaction 302 and a second transaction 304 exist in the same context. For example, the first transaction 302 and the second transaction 304 are started within the same thread of execution. The first transaction 302 is handled by an instrumented application 301 and the second transaction 304 is handled by an instrumented third-party component 303. A circle 302A represents the beginning of the first transaction 302, and a circle 302D represents the end of the first transaction 302. A circle 304A represents the beginning of the second transaction 304, and a circle 304D represents the end of the second transaction 304.

At stage A, the instrumented third-party component 303 detects that the second transaction 304 is ending. For example, the instrumented third-party component 303 detects a return function call.

At stage B, the instrumented third-party component 303 requests generation of a finished event 304C. For example, the instrumented third-party component 303 requests generation of the finished event 304C through an ARM API function call.

At stage C, a transaction correlation unit 305 instantiated in accordance with an API of the instrumented third-party component 303, generates the finished event 304C.

At stage D, the transaction correlation unit 305 determines that the second transaction 304 started during the first transaction 302 based on an outbound indicator in a second started event 304C on a started event stack 307. If the outbound indicator identifies the first transaction 302, the second transaction started during the first transaction and the second transaction is a sub-transaction of the first transaction.

At stage E, the transaction correlation unit 305 inserting an inbound indicator identifying the first transaction into the finished event 304C to indicate that the second transaction 304 is a sub-transaction of the first transaction 302. For example, the transaction correlation unit 305 can determine the first transaction identifier based on the second outbound indicator in the started event 304C. In addition, the transaction correlation unit 305 can insert an outbound indicator that identifies the second transaction 304 into the finished event 304C.

At stage F, the transaction correlation unit 307 pops the second started event 304C off the started event stack 307.

Figure 4:
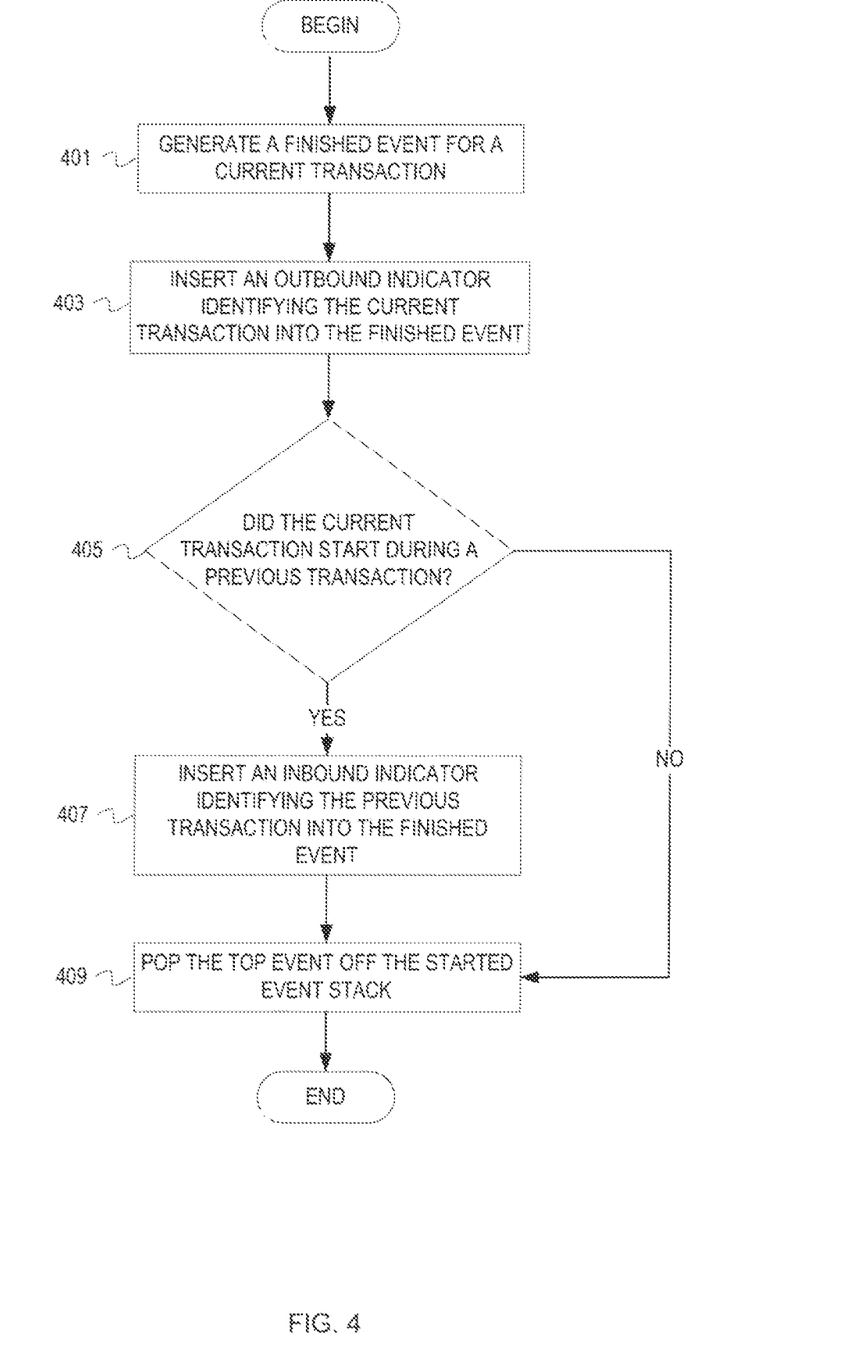
FIG. 4 depicts a flowchart of example operations for automatically correlating transaction finished events.

FIG. 4 depicts a flowchart of example operations for automatically correlating transaction finished events. Flow begins at block 401, where a finished event is generated for a current transaction. For example, the finished event is generated in response to an ARM API function call. Flow continues at block 403.

At block 403, an outbound indicator that identifies the current transaction is inserted into the finished event. Inserting the outbound indicator comprises determining an identifier of the new transaction, and storing the identifier in a data member of the finished event. For example, the new transaction's identifier may be determined based on a parameter passed in an ARM API function call. Flow continues at block 405.

At block 405, it is determined if the current transaction started during a previous transaction. The current transaction started during a previous transaction if a previous outbound indicator of an event at the top of a started event stack identifies a previous transaction. The current transaction is a sub-transaction of the previous transaction if the previous outbound indicator identifies the previous transaction. If the current transaction started during a previous transaction, flow continues at block 407. If the current transaction did not start during a previous transaction, flow continues at block 409.

At block 407, the previous outbound indicator of a top event on the started event stack identified the previous transaction, so an inbound indicator that identifies the previous transaction is inserted into the finished event. Flow continues at block 409.

At block 409, the top event is popped off the started event stack.

Although examples refer to using stacks to store started events, embodiments are not so limited. Embodiments can use other data structures such as queues, linked lists, arrays, etc.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, the operation for inserting an inbound indicator identifying the new transaction into the new started event in FIG. 2 may be performed before the operation for determining if the new transaction started during a current transaction. Referring to FIG. 4, the operation for inserting an inbound indicator identifying the current transaction into the finished event may be performed before the operation for determining if a current outbound indicator of a top event on a started event stack identifies a current transaction.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g. carrier waves, infrared signals, digital signals, etc.), or wireline, wireless, or other communications medium.

Computer program code for carrying out operations of the embodiments may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
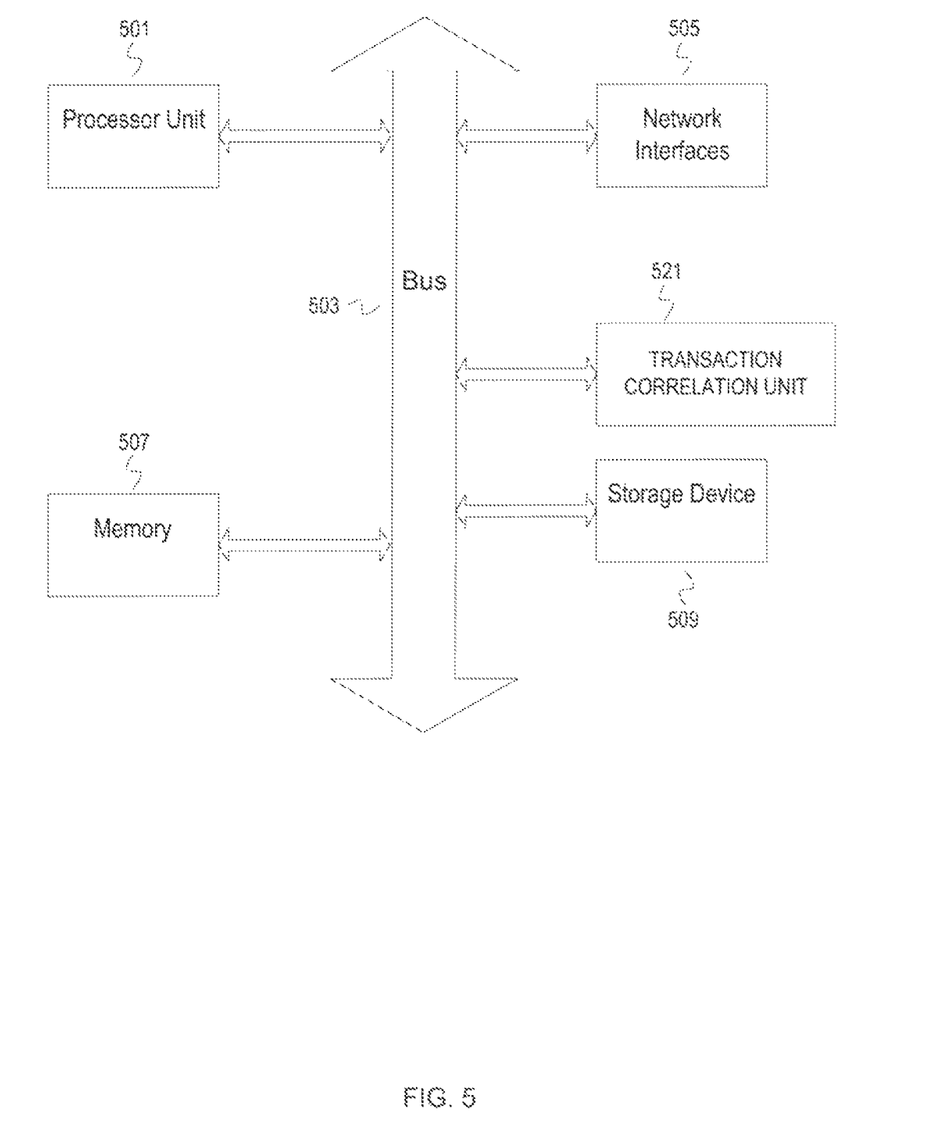
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM. DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes a transaction correlation unit 521. The transaction correlation unit 521 automatically correlates started and finished events based on context. Any one of the above described functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for automatically correlating transaction events as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method comprising:
   detecting that a first transaction is ending;
   generating a finished event for the first transaction;
   determining if the first transaction started during a second transaction based, at least in part, on an outbound indicator of a first started event for the first transaction;
   inserting an inbound indicator identifying the second transaction into the finished event to indicate that the first transaction is a sub-transaction of the second transaction if the first transaction started during the second transaction; and
   removing the first started event from a data structure of started events.

2. The computer implemented method of claim 1, wherein said detecting that the first transaction is ending further comprises detecting a return function call.

3. The computer implemented method of claim 1, wherein the data structure comprises a stack.

4. The computer implemented method of claim 1 wherein the finished event is generated by an instantiated transaction correlation unit that is instantiated in accordance with an application programming interface call.

5. The computer implemented method of claim 1, wherein said inserting the inbound indicator identifying the second transaction into the finished event to indicate that the first transaction is a sub-transaction of the second transaction comprises:
   determining an identifier of the second transaction based on a second started event for the second transaction that is stored in the data structure.

6. The computer implemented method of claim 1, wherein said inserting the inbound indicator identifying the second transaction into the finished event to indicate that the first transaction is a sub-transaction of the second transaction comprises inserting, into the finished event, a first outbound indicator identifying the first transaction.

7. A computer implemented method comprising:
   detecting that a first transaction has started;
   generating a first started event for the first transaction;
   determining if the first transaction started during a second transaction;
   inserting an outbound indicator identifying the second transaction into the first started event to indicate that the first transaction is a sub-transaction of the second transaction if it is determined that the first transaction started during the second transaction;
   storing the first started event in a data structure;
   detecting that the first transaction is ending;
   generating a finished event for the first transaction;
   determining if the first transaction started during the second transaction based, at least in part, on the outbound indicator of the first started event;
   inserting an inbound indicator identifying the second transaction into the finished event to indicate that the first transaction is a sub-transaction of the second transaction if the first transaction started during the second transaction; and
   removing the first started event from the data structure.

8. The computer implemented method of claim 7 further comprising determining that the outbound indicator identifies the second transaction.

9. A computer program product for automatically correlating transaction events, the computer program product comprising:
   a non-transitory computer usable medium having computer usable program code embodied therewith, the computer usable program code comprising:
   computer usable program code configured to,
      detect that a first transaction is ending;
      generate a finished event for the first transaction;
      determine if the first transaction started during a second transaction based, at least in part, on an outbound indicator of a first started event for the first transaction;
      insert an inbound indicator identifying the second transaction into the finished event to indicate that the first transaction is a sub-transaction of the second transaction if the first transaction started during the second transaction; and
      remove the first started event from a data structure of started events.

10. The computer program product of claim 9, wherein the computer usable program code being configured to insert the inbound indicator identifying the second transaction into the finished event to indicate that the first transaction is a sub-transaction of the second transaction comprises the computer usable code being configured to insert, into the finished event, a first outbound indicator identifying the first transaction.

11. The computer program product of claim 9, wherein said computer usable program code being configured to insert the inbound indicator identifying the second transaction into the finished event to indicate that the first transaction is a sub-transaction of the second transaction comprises the computer usable code being configured to:
   determine an identifier of the second transaction based on a second started event for the second transaction that is stored in the data structure.

12. A computer program product for automatically correlating transaction events, the computer program product comprising:
   a non-transitory computer usable medium having computer usable program code embodied therewith, the computer usable program code comprising:
   computer usable program code configured to,
      detect that a first transaction has started;
      generate a first started event for the first transaction;
      determine if the first transaction started during a second transaction;
      insert an outbound indicator identifying the second transaction into the first started event to indicate that the first transaction is a sub-transaction of the second transaction if the first transaction started during the second transaction;
      store the first started event in a data structure of started events;
      detect that the first transaction is ending;
      generate a finished event for the first transaction;
      determine if the first transaction started during the second transaction based, at least in part, on the outbound indicator of the first started event;
      insert an inbound indicator identifying the second transaction into the finished event to indicate that the first transaction is a sub-transaction of the second transaction if the first transaction started during the second transaction; and
remove the first started event from the data structure.

13. The computer program product of claim 12, wherein the computer usable code being further configured to determine that the outbound indicator identifies the second transaction.

14. A computer program product for automatically correlating transaction events, the computer program product comprising:
a non-transitory computer usable medium having computer usable program code embodied therewith, the computer usable program code comprising:
computer usable program code configured to,
detect that a first transaction is ending;
generate a finished event for the first transaction;
determine if the first transaction started during a second transaction based, at least in part, on an outbound indicator of a started event for the first transaction, wherein the outbound indicator indicates the second transaction;
insert an inbound indicator identifying the second transaction into the finished event to indicate that the first transaction is a sub-transaction of the second transaction if the first transaction started during the second transaction; and
remove the started event from a data structure of started events.

15. The computer program product of claim 14, wherein the computer usable code being further configured to determine that the outbound indicator identifies the second transaction.

16. An apparatus comprising:
a processing unit;
a network interface; and
a transaction correlation unit operable to,
detect that a first transaction is ending;
generate a finished event for the first transaction;
determine if the first transaction started during a second transaction based, at least in part, on an outbound indicator of a first started event for the first transaction;
insert an inbound indicator identifying the second transaction into the finished event to indicate that the first transaction is a sub-transaction of the second transaction if the first transaction started during the second transaction; and
remove the first started event from a data structure of started events.

17. The apparatus of claim 16, wherein the transaction correlation unit being further operable to determine that a second started event is stored in the data structure.

18. The apparatus of claim 16, wherein the transaction correlation unit being operable to insert the inbound indicator identifying the second transaction into the finished event to indicate that the first transaction is a sub-transaction of the second transaction further comprises the transaction correlation unit being operable to:
determine an identifier of the second transaction based on a second started event for the second transaction that is stored in the data structure.

19. An apparatus comprising:
a processing unit;
a network interface; and
a transaction correlation unit operable to,
detect that a first transaction has started;
generate a first started event for the first transaction;
determine if the first transaction started during a second transaction;
insert an outbound indicator identifying the second transaction into the first started event to indicate that the first transaction is a sub-transaction of the second transaction if the first transaction started during the second transaction;
store the first started event in a data structure;
detect that the first transaction is ending;
generate a finished event for the first transaction;
determine if the first transaction started during a second transaction based, at least in part, on the outbound indicator of the first started event;
insert an inbound indicator identifying the second transaction into the finished event to indicate that the first transaction is a sub-transaction of the second transaction if the first transaction started during the second transaction; and
remove the first started event from the data structure.

20. The apparatus of claim 19, wherein the transaction correlation unit being further operable to determine that the outbound indicator identifies the second transaction.

* * * * *